United States Patent [19]
Desmond

[11] Patent Number: 5,117,575
[45] Date of Patent: Jun. 2, 1992

[54] BAIT POSITIONING AND ATTACHMENT DEVICE

[76] Inventor: Noel K. Desmond, P.O. Box 1771, Chiefland, Fla. 32626

[21] Appl. No.: 651,932

[22] Filed: Apr. 1, 1991

[51] Int. Cl.⁵ .............................................. A01K 83/06
[52] U.S. Cl. ...................................... 43/44.8; 43/44.4; 43/44.2; 24/16 PB; 292/320
[58] Field of Search ................... 43/44.4, 44.8, 44.2; 24/16 PB; 292/320, 318, 321

[56] References Cited

U.S. PATENT DOCUMENTS

| | | | |
|---|---|---|---|
| 570,127 | 10/1896 | Gogle | 292/320 |
| 3,022,557 | 2/1962 | Logan | 24/16 PB |
| 3,197,912 | 8/1965 | Kramer | 43/44.4 |
| 3,197,913 | 8/1965 | Rainey | 43/44.8 |
| 3,265,426 | 8/1966 | Brooks | 24/16 PB |
| 3,398,477 | 8/1968 | Paluzzi | 43/44.4 |
| 3,588,963 | 6/1971 | Moberg | 24/16 PB |
| 3,654,669 | 4/1972 | Fulton | 24/16 PB |
| 4,229,901 | 10/1980 | Flowers | 43/44.8 |
| 4,471,558 | 9/1984 | Garcia | 43/44.8 |
| 4,910,831 | 3/1990 | Bingold | 24/16 PB |

Primary Examiner—Kurt Rowan
Attorney, Agent, or Firm—Walter J. Monacelli

[57] ABSTRACT

The bait fish bridle positioning and attachment device disclosed herein includes a locking device having two flexible locking sections, each having a series of conically shaped knob sections, and having two openings in the locking device into which the flexible knob sections are drawn after embracing the bait fish and the hook shank. After tightening the flexible sections onto the bait fish and the hook shank, the sections are prevented from moving in reverse direction by the locking knobs on the flexible sections. The device may be made of nylon or similar composite material.

8 Claims, 2 Drawing Sheets

BAIT POSITIONING AND ATTACHMENT DEVICE

FIELD OF INVENTION

My invention relates to fishing and more particularly to allow the easy and quick attachment and positioning of live and dead bait fish to a fishing hook of varying sizes and to assure minimum physical damage to the bait fish there by insuring prolonged use of same.

DESCRIPTION OF THE PRIOR ART

The attachment of bait fish to fishing hooks has been accomplished prior to this by;
1. Penetrating the bait fish with the hook. This has resulted in excessive tearing and ripping, causing excessive physical damage to the bait fish thereby shorting the usable time span of both live and dead bait fish.
2. By threading line or fishing string through the eye socket or lower and upper jaw of bait fish, then tying the rigged bait fish to a fishing hook.

All of the above has resulted in the premature serviceability of live and dead bait fish.

SUMMARY OF THE INVENTION

My invention provides and easy and quick improved positioning and attachment device of flexible 100% nylon or similar composite material wherein a minimum of time and expertise is required in attaching live and dead bait fish to fishing hooks, and wherein a minimum of physical damage is inflicted, thereby insuring prolonged life and or use.

My invention provides a rigging needle of varying lengths which is semi-turgid and able to penetrate bait fish with minimum physical damage; a smooth flexible section of varying lengths which is the final contact and restraining point; a self locking knob section of varying lengths which locks the smooth flexible section in place and a second flexible self locking knob section of varying lengths with smooth starter tip that is formed into a 360 degree loop and is slipped over the shank of a hook and pulled tight attaching the whole unit to the hook; a set of one piece horizontal locks side by side which secure the two flexible loop ends into two separate 360 degree loops.

The foregoing and other objects, features and advantages of the invention will be apparent from the following more detailed description of preferred embodiment of the invention as illustrated in the accompanied drawings.

DETAILED DESCRIPTION OF THE INVENTION

Figure 1:
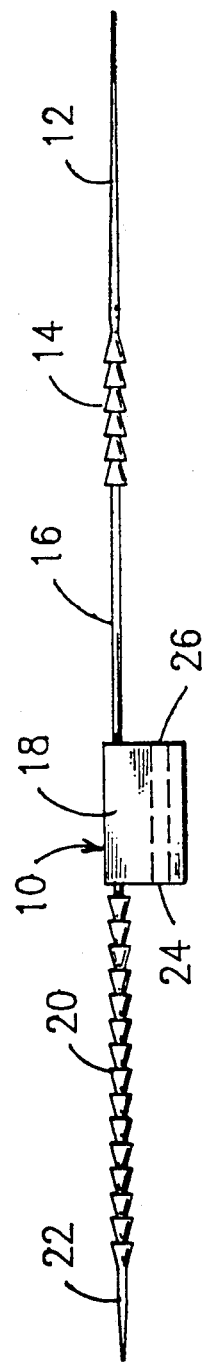
FIG. 1 is a side elevational view of the Magley Bait Bridle embodying the invention.
Figure 3:
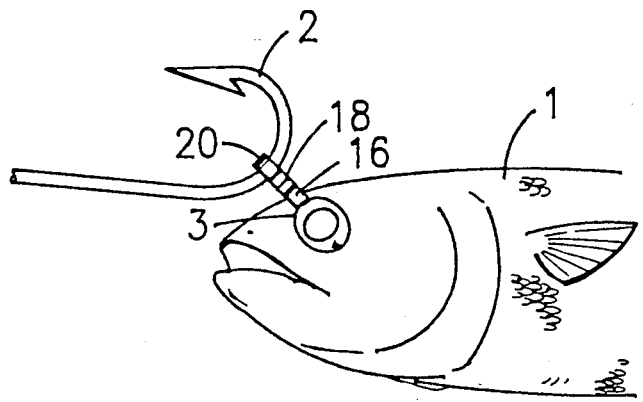
FIG. 3 is a side elevational view of the means of positioning and attachment of bait fish to hook by avenue through the bait fish eye-socket where hook is positioned in front of bait fish or above upper jaw.

Referring to FIG. 1, the Magley Bait Bridle Positioning and Attachment Device 10, consists of a dual locking mechanism 18 incorporating two horizontal side by side locking openings, 24 and 26 which are arranged parallel to each other and approximately in similar horizontal positions. The bait side 28 is comprised of a semi-turgid rigging needle 12 used to penetrate the bait fish in varying manners and also used as a starter tip by inserting the rigging needle 12 into lock opening 26 forming a 360 degree loop. The rigging needle 12 is pulled through lock opening 26 until locking knobs 14 come into contact with lock opening 26 and the desired length and position is achieved. The locking knobs 14 are cone shaped and arranged so that the apex of the cones enter the lock opening 26 with no problem but the bottoms of the cones 14 fit snugly or tightly into this opening, so that locking knobs 14 may be pulled as described through opening 26 but resists movement in the reverse direction. The flexible smooth loop section 16 is positioned in a manner as to cause minimum damage and trauma to bait fish 1 (FIG. 3). The positioning distance of bait fish to the hook is achieved by pulling the locking knob section 14 through lock 26 until desired hook positioning and length is accomplished, then the excess locking knobs 14 and rigging needle 12 is cut off.

The hook side 30 of the Magley Bait Bridle Positioning and Attachment Device 10 is formed and used in the following manner. The starter tip 22 is inserted into lock opening 24 and pulled through until locking knobs 20 come through with lock opening 24 forming a 360 degree loop. Locking knobs 20 effect a locking similar to that effected by knobs 14 in opening 26. This may be left in the maximum length available and the live bait fish with the Bridle attached, kept alive in a live bait well until its use is required. When the live bait fish is required for use, this 360 degree loop formed by the locking knobs 20 is slipped over the curved shank of a fishing hook and the starter tip 22 and locking knobs 20 are pulled through lock opening 24 until the remainder of locking knobs 20 are tight and secure against the fishing hook shank. Then the excess material of starter tip 22 and the locking knobs 20 are cut off. The bait fish is now firmly attached to the fishing hook and ready for use.

Figure 2:
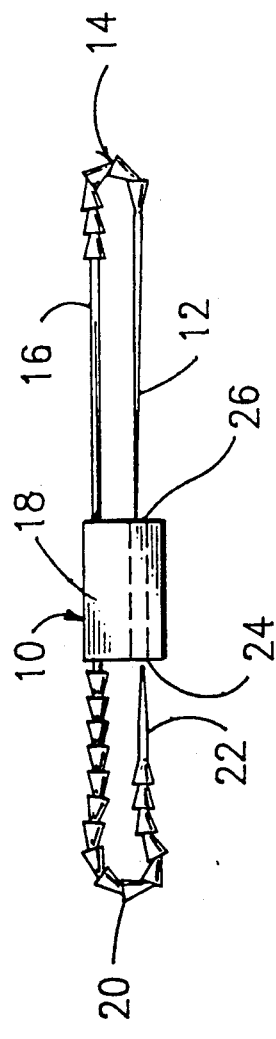
FIG. 2 is a side elevational view showing the two 360 degree loops and the means and angle of entry into their respective locks.

FIG. 2 shows the locking device of FIG. 1 in looped arrangement with starting needle 12 positioned to enter lock opening 26 and starting tip 22 positioned to enter lock opening 24.

FIG. 3 shows the locking device of FIGS. 1 and 2 positioned in locking arrangement with smooth looped section 16 passed between eyeball 3 and the eye socket of fish 1 and locking knobs 20 are fastened around hook 2.

Figure 4:
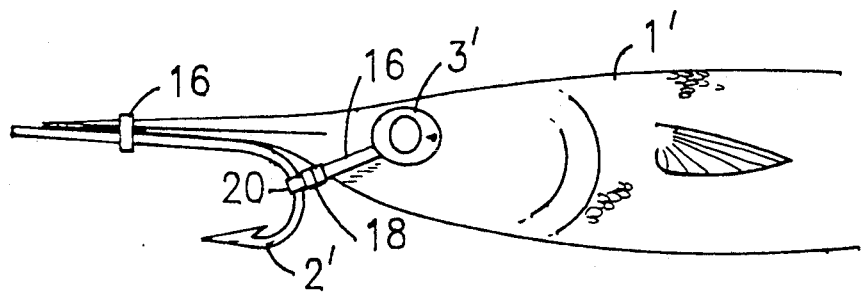
FIG. 4 is a side elevational view of the means of positioning and attachment of long billed bait fish to hook by avenue of bait fish eye-socket and where hook is placed under lower jaw and bill of bait fish is secured forward by a second Magley Bait Bridle or similar device.

FIG. 4 shows the locking device of FIGS. 1 and 2 positioned in locking arrangement with smooth looped section 16 passed between the eyeball 3' and the eye socket of fish 1' and the locking knobs 20 are fastened around the shank of hook 2'. A second locked device of this type or related type is fastened around the bill or snout of fish 1' and another part of the shank of hook 2'.

Figure 5:
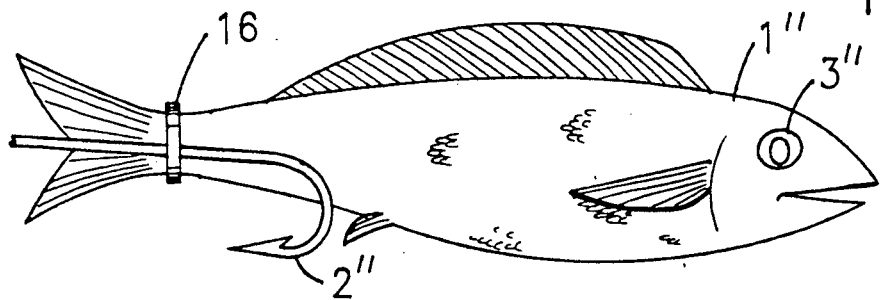
FIG. 5 is a side elevational view of positioning and attachment of bait fish to hook by avenue of base of tail forward of tail fin.

FIG. 5 shows the locking device of FIGS. 1 and 2 positioned around a narrow portion of the tail of fish 1" with smooth looped section 16 fastened around both the fish tail and the shank of hook 2". In FIGS. 4 and 5 one loop can be fastened around both the hook shank and the part of the fish or they can be fastened individually with the respective loops of the device.

Figure 6:
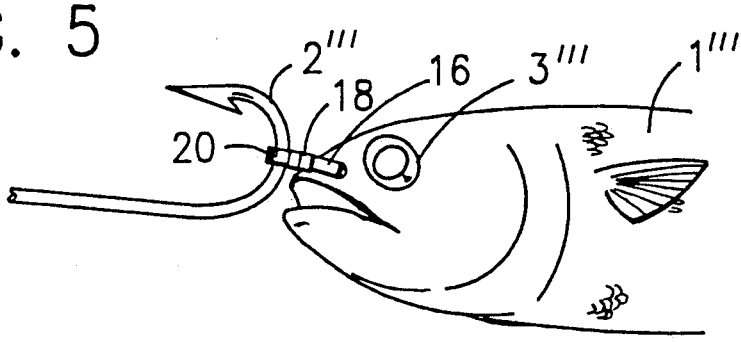
FIG. 6 is a side elevational view of positioning and attachment of bait fish to hook by avenue through upper jaw.

FIG. 6 shows the locking device of FIGS. 1 and 2 positioned with the smooth looped section 16 fastened through the snout or jaw of fish 1''' and locking knobs 20 fastened around the shank of hook 2'''.

The positioning and attachment device described and claimed herein facilitates fast and easy attachment to a fishing hook for subsequent trowling with minimal physical damage and trauma to bait fish. Moreover this device allows a variation in the distance between the fish and the attached fishing hook. Furthermore the size of the respective sections or portions of the device can be modified in accordance with the size of the fish to be used. This device allows the easy and fast attachment to a bait fish for keeping in a live bait well until an appropriate time for attachment to a fish hook.

As illustrated in FIG. 4, one device of this invention may be used to fasten the fish through an eye socket and a second device used to fasten the fish to the hook in a second position by a second device.

What is claimed is:

1. A positioning and bait fish attachment device comprising:
   (a) a locking means having a substantial length, having substantially parallel first and second openings extending through the length thereof and having first and second sides thereof, said first and second sides being positioned as opposite sides of said locking means, and said openings having one end of each exiting from said first side and the opposite ends of said openings exiting from said second side;
   (b) a first flexible loop section attached at one end thereof to said first side of said locking means and comprising at the end of said loop section attached to said locking means a first portion of flexible cord, a second flexible portion comprising a series of cones flexibly attached to adjacent loops, each cone having an apex and a base, the respective cones each having the base thereof attached to the apex of an adjacent cone with the base of each cone positioned closer to said locking means than the apex thereof, and a third portion of said first flexible loop section comprising a rigging needle of substantial length having the diameter in its maximum cross-section transverse to the length of said needle smaller than the diameter of said first opening, the diameter at the base of each said cone in said second flexible loop portion being of an appropriate size to fit snugly in said first opening whereby said cone may be pulled through said first opening in one direction but not allowing the said cone to be pulled backward through said first opening in the reverse direction; and
   (c) a second flexible loop section attached at one end thereof to said second side of said locking means and comprising at that end of said second loop section attached to said locking means a first portion of said second flexible loop section a series of cones each flexibly attached to adjacent cones, each cone having an apex and a base, the respective cones each having the base thereof attached to the apex of an adjacent cone with the base of each cone positioned closer to said locking means than the apex thereof, a second portion of said second flexible loop section comprising a starting tip having its maximum cross-section transverse to the length of said starting tip smaller than the diameter of said second opening, the diameter at the base of each said cone in said second flexible loop section being of an appropriate size to fit snugly in said second opening whereby said cone may be pulled through said first opening in one direction but not allowing the said cone to be pulled backward through said second opening in the reverse direction.

2. The positioning and bait fish attachment device of claim 1 in the length of the said portion of flexible cord is adjusted according to the size of the fish to be used.

3. A method of securing a bait fish comprising the steps of:
   (1) positioning adjacent to said fish an attachment device comprising:
      (a) a locking means having a substantial lenth, having substantially parallel first and second openings extending through the length thereof and having first and second sides thereof, said first and second sides being positioned as opposite sides of said locking means, and said openings having one end of each exiting from said first side and the opposite ends of said openings exiting from said second side;
      (b) a first flexible loop section attached at one end thereof to said first side of said locking means and comprising at the end of said loop section attached to said locking means a first portion of flexible cord, a second flexible portion comprising a series of cones flexibly attached to adjacent loops, each cone having an apex and a base, the respective cones each having the base thereof attached to the apex of an adjacent cone with the base of each cone positioned closer to said locking means than the apex thereof, and a third portion of said first flexible loop section comprising a rigging needle of substantial length having the diameter in its maximum cross-section transverse to the length of said needle smaller than the diameter of said first opening, the diameter at the base of each said cone in said second flexible loop portion being of an appropriate size to fit snugly in said first opening whereby said cone may be pulled through said first opening in one direction but not allowing the said cone to be pulled backward through said first opening in the reverse direction; and
      (c) a second flexible loop section attached at one end thereof to said second side of said locking means and comprising at that end of said second loop section attached to said locking means a first portion of said second flexible loop section a series of cones each flexibly attached to adjacent cones, each cone having an apex and a base, the respective cones each having the base thereof attached to the apex of an adjacent cone with the base of each cone positioned closer to said locking means than the apex thereof, a second portion of said second flexible loop section comprising a starting tip having its maximum cross-section transverse to the length of said starting tip smaller than the diameter of said second opening, the diameter at the base of each said cone in said second flexible loop section being of an appropriate size to fit snugly in said second opening whereby said cone may be pulled through said first opening in one direction but not allowing the said cone to be pulled backward through said second opening in the reverse direction;

(2) inserting said rigging needle in and through the body of said bait fish.

(3) thereafter inserting said rigging needle into said first opening on said first side of said locking means and pulling said needle through said first opening until at least a portion of said series of cones attached to said needle is pulled through said first opening whereby said first flexible loop section is pulled snugly around a portion of said bait fish and said first flexible loop section is prevented from becoming loosed from its grip on said fish by the lodging of the base of one of said cones attached to said needle against the edge of the said first opening exiting from the second side of said locking means.

4. The method of claim 3 in which said second flexible loop section is placed at least partially around the shank of a fish hook and said starting tip attached to said second flexible loop section is inserted into said second opening on the second side of said locking means and through said second opening, said starting tip and said second flexible loop section being pulled through said second opening until said fish hook shank is firmly secured and said second flexible loop section is prevented from sliding in a reverse direction in said second opening by the lodging of the base of one of said cones attached to said starting tip against the edge of the said second opening exiting from said first side of said locking means.

5. The method of claim 4 in which said first flexible loop section is passed through the eye socket of said bait fish.

6. The method of claim 4 in which said first flexible loop section is passed through the jaw of said bait fish.

7. The method of claim 4 in which said first flexible loop section is passed around a narrow part of said fish.

8. The method of claim 5 in which a second fastening means is used to embrace the bill of said bait fish and also a second portion of said hook shank.

* * * * *